United States Patent
Fang et al.

(10) Patent No.: US 11,375,842 B2
(45) Date of Patent: Jul. 5, 2022

(54) METHOD FOR CONTROLLING A COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Zhen Fang, Foshan (CN); Ying Su, Foshan (CN); Jing Li, Foshan (CN); Xinyuan Wang, Foshan (CN); Shanshan Cao, Foshan (CN); Liying Wang, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 696 days.

(21) Appl. No.: 16/259,956

(22) Filed: Jan. 28, 2019

(65) Prior Publication Data
US 2019/0150652 A1    May 23, 2019

Related U.S. Application Data

(63) Continuation of application No. PCT/CN2016/106028, filed on Nov. 16, 2016.

(30) Foreign Application Priority Data

Oct. 25, 2016    (CN) .......................... 201610933443.5

(51) Int. Cl.
*A47J 27/08*    (2006.01)
*A47J 36/32*    (2006.01)
(Continued)

(52) U.S. Cl.
CPC .......... *A47J 27/0802* (2013.01); *A47J 27/004* (2013.01); *A47J 36/32* (2013.01); *A47J 36/00* (2013.01); *A47J 2027/043* (2013.01)

(58) Field of Classification Search
CPC . F24C 3/122; F24C 7/081; F24C 7/085; A47J 27/0802; A47J 27/004; A47J 36/32; A47J 36/00; A47J 2027/043
(Continued)

(56) References Cited

U.S. PATENT DOCUMENTS

2013/0269539 A1* 10/2013 Polt .......................... F24C 7/081
99/331

FOREIGN PATENT DOCUMENTS

CN    105212685 A    1/2016
CN    105425643 A    3/2016
(Continued)

OTHER PUBLICATIONS

Foshan Shunde Midea Electrical Heating Appliances Manufacturing Co. Ltd., First Office Action, JP2019-507158, dated Apr. 7, 2020, 6 pgs.
(Continued)

*Primary Examiner* — Phuong T Nguyen
(74) *Attorney, Agent, or Firm* — Morgan, Lewis & Bockius LLP

(57) ABSTRACT

The present disclosure provides a cooking appliance control method, a control device, and a cooking appliance. The cooking appliance acquires cooking effect evaluation information of a cooking appliance provided by a user. The cooking effect evaluation information comprises a plurality of evaluation dimensions for evaluating cooking effects of the cooking appliance and scores of the plurality of evaluation dimensions. The cooking appliance adjusts control parameters of the cooking appliance according to the cook-
(Continued)

ing effect evaluation information, so as to control the cooking of the cooking appliance according to the adjusted control parameters. By adjusting the control parameters of the cooking appliance according to the cooking effect evaluation information, the cooking appliance ensures that the final cooking effect satisfy the requirements of the user and improves the use experience of the user.

11 Claims, 2 Drawing Sheets

(51) Int. Cl.
  *A47J 27/00* (2006.01)
  *A47J 36/00* (2006.01)
  *A47J 27/04* (2006.01)
(58) Field of Classification Search
  USPC .......... 219/441, 492, 494, 497, 506; 99/328, 99/331
  See application file for complete search history.

(56) References Cited

FOREIGN PATENT DOCUMENTS

| | | |
|---|---|---|
| CN | 105982506 A | 10/2016 |
| JP | 2003275099 A | 9/2000 |
| JP | 2000342444 A | 12/2000 |
| JP | 2006000352 A | 1/2006 |
| JP | 2007307415 A | 11/2007 |
| JP | 2015206585 A | 11/2007 |

OTHER PUBLICATIONS

Foshan Shunde Midea Electrical Heating Appliances Manufacturing Co. Ltd., Extended European Search Report, EP16919913.0, dated May 27, 2019, 7 pgs.

Foshan Shunde Midea Electrical Heating Appliances Manufacturing Co. Ltd., International Search Report, PCT/CN2016/106028, dated Aug. 7, 2017, 4 pgs.

* cited by examiner

METHOD FOR CONTROLLING A COOKING APPLIANCE

CROSS-REFERENCE TO RELATED APPLICATIONS

This application is a continuation application of PCT/CN2016/106028, entitled "COOKING APPLIANCE CONTROL METHOD AND CONTROL DEVICE, COOKING APPLIANCE AND CONTROL APPARATUS" filed on Nov. 16, 2016, which claims priority to Chinese Patent Application No. 201610933443.5, entitled "COOKING APPLIANCE CONTROL METHOD AND CONTROL DEVICE, COOKING APPLIANCE AND CONTROL APPARATUS" filed with the State Intellectual Property Office of P. R. China on Oct. 25, 2016, all of which are incorporated herein by reference.

TECHNICAL FIELD

The present disclosure relates to the technical field of kitchen appliances, and particularly to a cooking appliance control method, a cooking appliance control device, a cooking appliance and a control apparatus.

BACKGROUND

Different users have different requirements on the cooking effects of the cooking appliances, for example, with regard to the cooking effect of an electric rice cooker, some users like rice with soft and sticky taste, but some prefer hard-boiled chewy rice. In the related art, after an electric rice cooker leaves the factory, the control parameters thereof during the cooking process are fixed, and the user can only adjust the ratio of rice to water by experience in order to obtain different tastes, which usually results in unsatisfactory cooking effects, and affects the use experience of the user.

SUMMARY

The present disclosure aims to solve at least one of the technical problems existing in the prior art or in the related art.

To this end, an object of the present disclosure is to provide a novel cooking appliance control solution capable of adjusting the control parameters of a cooking appliance according to cooking effect evaluation information so as to ensure the final cooking effect, which satisfies the use requirements of the user and improves the use experience of the user.

In order to achieve the above object, according to an embodiment of the first aspect of the present disclosure, there is provided a cooking appliance control method, comprising: acquiring cooking effect evaluation information of a cooking appliance, wherein the cooking effect evaluation information comprises a plurality of evaluation dimensions for evaluating cooking effects of the cooking appliance and scores of the plurality of evaluation dimensions; and adjusting control parameters of the cooking appliance according to the cooking effect evaluation information, so as to control the cooking of the cooking appliance according to the adjusted control parameters.

For the cooking appliance control method according to an embodiment of the present disclosure, cooking effect evaluation information of a cooking appliance is acquired, and control parameters of the cooking appliance is adjusted according to the cooking effect evaluation information, so that the cooking of the cooking appliance is controlled according to the adjusted control parameters. Since the cooking effect evaluation information directly reflects the cooking effect satisfaction degree of the user, the adjustment of the control parameters according to the cooking effect evaluation information ensures that the final cooking effects fit the actual requirements of the user better, which improves the use experience of the user.

The cooking appliance control method according to the embodiment of the present disclosure can further have the following technical features:

According to a first embodiment of the present disclosure, the step of adjusting control parameters of the cooking appliance according to the cooking effect evaluation information specifically comprises: determining a satisfaction degree of the user for each of the plurality of evaluation dimensions according to the scores of the plurality of evaluation dimensions; and adjusting the control parameters of the cooking appliance according to the satisfaction degree of the user for each evaluation dimension.

In the cooking appliance control method according to an embodiment of the present disclosure, a satisfaction degree of the user for each of the plurality of evaluation dimensions is determined according to the scores of the plurality of evaluation dimensions, the control parameters of the cooking appliance are adjusted according to the satisfaction degree of the user for each evaluation dimension, and the satisfaction degree of the user for each evaluation dimension is determined according to the score of each evaluation dimension, which ensures that the cooking effects required by the user can be accurately achieved, and therefore the control parameters of the cooking appliance can be adjusted more completely and more accurately.

According to the first embodiment of the present disclosure, when the cooking appliance control method is used in a cooking appliance, the step of acquiring cooking effect evaluation information of the cooking appliance specifically comprises: receiving the cooking effect evaluation information input by the user; or receiving the cooking effect evaluation information sent by a control apparatus connected to the cooking appliance.

For the cooking appliance control method according to an embodiment of the present disclosure, there are a plurality of methods for acquiring the cooking effect evaluation information of the cooking appliance: one method is that a score setting interface comprising a plurality of evaluation dimensions can be set on the cooking appliance, the user can set a score for each of the plurality of evaluation dimensions via the score setting interface, and the cooking appliance generates cooking effect evaluation information according to the score of each evaluation dimension; and another method is that the user sets the cooking effect evaluation information by means of a control apparatus, and the control apparatus sends the cooking effect evaluation information to the cooking appliance, wherein the control apparatus can be a smartphone, a PC, etc. and can be connected to the cooking appliance in a wired or wireless mode.

According to the first embodiment of the present disclosure, when the cooking appliance control method is used in a control apparatus, the step of acquiring cooking effect evaluation information of the cooking appliance specifically comprises: displaying a score setting interface comprising the plurality of evaluation dimensions, for the user to set a score for each of the plurality of evaluation dimensions, and generating the cooking effect evaluation information according to the score of each evaluation dimension.

In the cooking appliance control method according to an embodiment of the present disclosure, the user can further set a score for each of the plurality of evaluation dimensions on the score setting interface of the control apparatus, which satisfies the use requirements of the user.

According to the first embodiment of the present disclosure, the step of controlling the cooking appliance according to the adjusted control parameters specifically comprises: sending the adjusted control parameters to the cooking appliance, so that the cooking appliance cooks according to the received adjusted control parameters.

In the cooking appliance control method according to an embodiment of the present disclosure, by sending the adjusted control parameters to the cooking appliance to make the cooking appliance cook according to the received adjusted control parameters, the user can remotely control the cooking appliance using the control apparatus.

According to the first embodiment of the present disclosure, the method further comprises: sending the cooking effect evaluation information to the cooking appliance.

In the cooking appliance control method according to an embodiment of the present disclosure, by sending the cooking effect evaluation information to the cooking appliance, the cooking appliance can adjust the control parameters by itself according to the cooking effect evaluation information, without any need to set the cooking effect evaluation information through the cooking appliance.

According to an embodiment of the second aspect of the present disclosure, there is provided a cooking appliance control device, comprising: an acquiring unit for acquiring a cooking effect evaluation information of a cooking appliance, wherein the cooking effect evaluation information comprises a plurality of evaluation dimensions for evaluating cooking effects of the cooking appliance and scores of the plurality of evaluation dimensions; and a processing unit for adjusting control parameters of the cooking appliance according to the cooking effect evaluation information, so as to control the cooking of the cooking appliance according to the adjusted control parameters.

For the cooking appliance control device according to an embodiment of the present disclosure, cooking effect evaluation information of a cooking appliance is acquired, and control parameters of the cooking appliance is adjusted according to the cooking effect evaluation information, so that the cooking of the cooking appliance is controlled according to the adjusted control parameters. Since the cooking effect evaluation information directly reflects the cooking effect satisfaction degree of the user, the adjustment of the control parameters according to the cooking effect evaluation information ensures that the final cooking effects fit the actual requirements of the user better, which improves the use experience of the user.

The cooking appliance control device according to the embodiment of the present disclosure can further have the following technical features:

According to one embodiment of the present disclosure, the processing unit is specifically used for: determining a satisfaction degree of the user for each of the plurality of evaluation dimensions according to the scores of the plurality of evaluation dimensions; and adjusting the control parameters of the cooking appliance according to the satisfaction degree of the user for each evaluation dimension.

In the cooking appliance control device according to an embodiment of the present disclosure, a satisfaction degree of the user for each of the plurality of evaluation dimensions is determined according to the scores of the plurality of evaluation dimensions, the control parameters of the cooking appliance are adjusted according to the satisfaction degree of the user for each evaluation dimension, and the satisfaction degree of the user for each evaluation dimension is determined according to the score of each evaluation dimension, which ensures that the cooking effects required by the user can be accurately achieved, and therefore the control parameters of the cooking appliance can be adjusted more completely and more accurately.

According to an embodiment of the third aspect of the present disclosure, there is proposed a cooking appliance, comprising: a cooking appliance control device as described in any of the above embodiments, wherein the acquiring unit is specifically used for: receiving the cooking effect evaluation information input by the user; or receiving the cooking effect evaluation information sent by a control apparatus connected to the cooking appliance.

For the cooking appliance according to an embodiment of the present disclosure, there are a plurality of methods for acquiring the cooking effect evaluation information of the cooking appliance: one method is that a score setting interface comprising a plurality of evaluation dimensions can be set on the cooking appliance, the user can set a score for each of the plurality of evaluation dimensions via the score setting interface, and the cooking appliance generates cooking effect evaluation information according to the score of each evaluation dimension; and another method is that the user sets the cooking effect evaluation information by means of a control apparatus, and the control apparatus sends the cooking effect evaluation information to the cooking appliance, wherein the control apparatus can be a smartphone, a PC, etc. and can be connected to the cooking appliance in a wired or wireless mode.

According to an embodiment of the fourth aspect of the present disclosure, there is proposed a control apparatus, comprising: a cooking appliance control device as described in any of the above embodiments, wherein the acquiring unit is specifically used for: displaying a score setting interface comprising the plurality of evaluation dimensions, for the user to set a score for each of the plurality of evaluation dimensions, and generating the cooking effect evaluation information according to the score of each evaluation dimension.

For the control apparatus according to an embodiment of the present disclosure, the user can further set a score for each of the plurality of evaluation dimensions on the score setting interface of the control apparatus, which satisfies the use requirements of the user.

The control apparatus according to the embodiment of the present disclosure can further have the following technical features:

According to one embodiment of the present disclosure, the processing unit is further used for sending the adjusted control parameters to the cooking appliance, so that the cooking appliance cooks according to the received adjusted control parameters.

In the control apparatus according to an embodiment of the present disclosure, by sending the adjusted control parameters to the cooking appliance to make the cooking appliance cook according to the received adjusted control parameters, the user can remotely control the cooking appliance using the control apparatus.

According to one embodiment of the present disclosure, the control apparatus further comprises: a sending unit for sending the cooking effect evaluation information to the cooking appliance.

For the control apparatus according to an embodiment of the present disclosure, by sending the cooking effect evaluation information to the cooking appliance, the cooking appliance can adjust the control parameters by itself according to the cooking effect evaluation information, without any need to set the cooking effect evaluation information through the cooking appliance.

The additional aspects and advantages of the present disclosure will partially be set forth in the following description, and will partially become apparent from the following description, or be learned through the implementation of the present disclosure.

BRIEF DESCRIPTION OF DRAWINGS

The above and/or additional aspects and advantages of the present disclosure will become apparent and readily understood from the following description of the embodiments with reference to the drawings, in which.

DETAILED DESCRIPTION OF EMBODIMENTS

In order to understand the objects, features and advantages of the present disclosure more clearly, the present disclosure is further described in detail with reference to the accompanying drawings and the embodiments. It should be noted that the embodiments of the present application and the features of the embodiments can be combined with each other if there is no conflict.

In the following description, numerous details are set forth to facilitate full understanding of the present disclosure. However, the present disclosure may also be implemented in other ways than those described herein. Thus, the protection scope of the present disclosure is not limited by the embodiments disclosed below.

Figure 1:
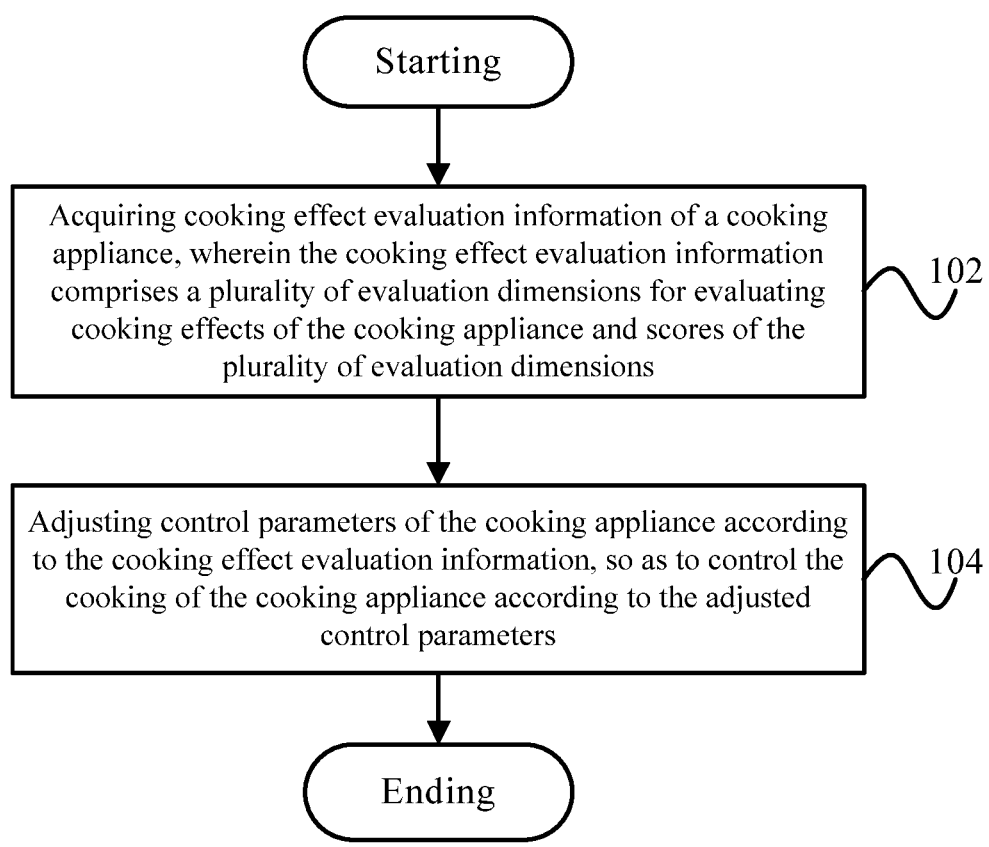
FIG. 1 is a schematic flow diagram of a cooking appliance control method according to an embodiment of the present disclosure.

FIG. 1 is a schematic flow diagram of a cooking appliance control method according to an embodiment of the present disclosure.

As shown in FIG. 1, the cooking appliance control method according to an embodiment of the present disclosure comprises:

step 102, acquiring cooking effect evaluation information of a cooking appliance, wherein the cooking effect evaluation information comprises a plurality of evaluation dimensions for evaluating cooking effects of the cooking appliance and scores of the plurality of evaluation dimensions; and step 104, adjusting control parameters of the cooking appliance according to the cooking effect evaluation information, so as to control the cooking of the cooking appliance according to the adjusted control parameters.

By acquiring cooking effect evaluation information of a cooking appliance and adjusting control parameters of the cooking appliance according to the cooking effect evaluation information, the cooking of the cooking appliance is controlled according to the adjusted control parameters. Since the cooking effect evaluation information directly reflects the cooking effect satisfaction degree of the user, the adjustment of the control parameters according to the cooking effect evaluation information ensures that the final cooking effects fit the actual requirements of the user better, which improves the use experience of the user.

The cooking appliance control method according to the embodiment of the present disclosure can further have the following technical features:

According to a first embodiment of the present disclosure, the step of adjusting control parameters of the cooking appliance according to the cooking effect evaluation information specifically comprises: determining a satisfaction degree of the user for each of the plurality of evaluation dimensions according to the scores of the plurality of evaluation dimensions; and adjusting the control parameters of the cooking appliance according to the satisfaction degree of the user for each evaluation dimension.

By determining a satisfaction degree of the user for each of the plurality of evaluation dimensions according to the scores of the plurality of evaluation dimensions, adjusting the control parameters of the cooking appliance according to the satisfaction degree of the user for each evaluation dimension, and determining the satisfaction degree of the user for each evaluation dimension according to the score of each evaluation dimension, it is ensured that the cooking effects required by the user can be accurately achieved, and therefore the control parameters of the cooking appliance can be adjusted more completely and more accurately.

According to the first embodiment of the present disclosure, when the cooking appliance control method is used in a cooking appliance, the step of acquiring cooking effect evaluation information of the cooking appliance specifically comprises: receiving the cooking effect evaluation information input by the user; or receiving the cooking effect evaluation information sent by a control apparatus connected to the cooking appliance.

There are a plurality of methods for acquiring the cooking effect evaluation information of the cooking appliance: one method is that a score setting interface comprising a plurality of evaluation dimensions can be set on the cooking appliance, the user can set a score for each of the plurality of evaluation dimensions via the score setting interface, and the cooking appliance generates cooking effect evaluation information according to the score of each evaluation dimension; and another method is that the user sets the cooking effect evaluation information by means of a control apparatus, and the control apparatus sends the cooking effect evaluation information to the cooking appliance, wherein the control apparatus can be a smartphone, a PC, etc. and can be connected to the cooking appliance in a wired or wireless mode.

Figure 5:
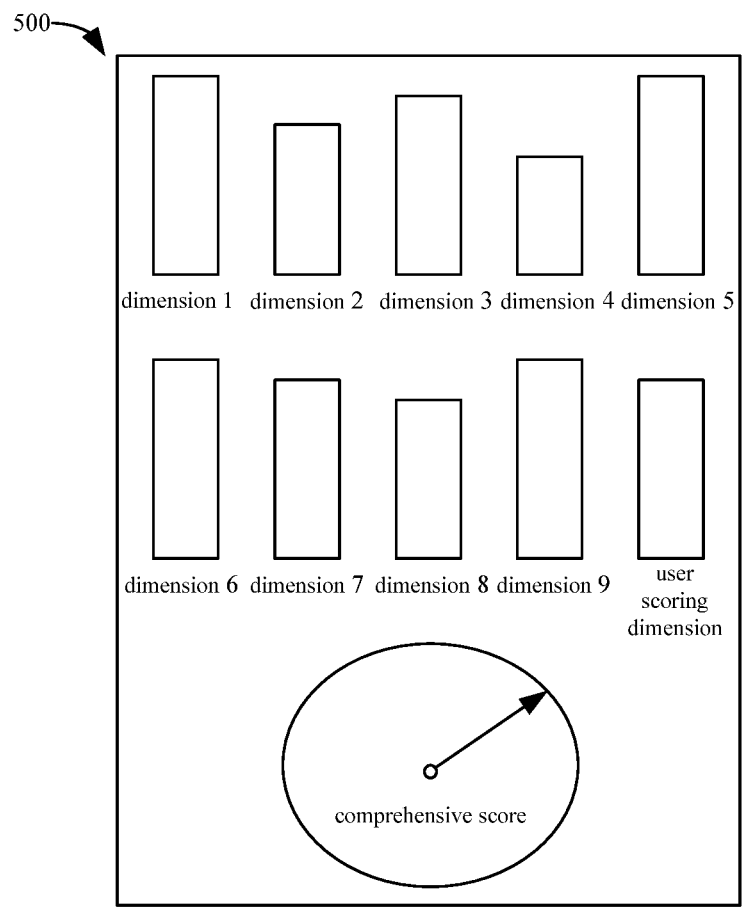
FIG. 5 is a schematic diagram of a score setting interface according to an embodiment of the present disclosure.

Specifically, whether the cooking effect evaluation information is acquired by the cooking appliance or by the control apparatus, it is always necessary to set a score for each evaluation dimension via the score setting interface 500. As shown in FIG. 5, the score setting interface 500 comprises dimension 1-dimension 9 (nine dimensions consisting of, for example, hardness, water content and gelatinization degree representing the palatability, flatness, fluffiness degree and puffing rate representing the appearance, and the other dimensions, it shall be noted that the nine dimensions are not limited to the dimensions indicated above, and can be specifically set according to actual requirements), and comprehensive score and user scoring dimension can also be added. The user may freely adjust the height of the columns in the columnar diagram to express the satisfaction degree for each dimension, when the product leaves factory, the user evaluation dimension is a null value, and the default dimensions jointly constitute the cooking capability and the single-dimension level capability of the product when it leaves factory. When in use, the user can select to set the user scoring dimension, and the value of the comprehensive score will automatically be adjusted. The user can perform adjustment multiple times, or the user can select to restore the factory settings. During the adjusting process, the user can give a score for each dimension according to the cooking effect evaluated by the user in sensory ways, the system can store a plurality of adjustment programs associated with respective dimensions, and invoke a corresponding adjustment program according to the user's score for a dimension, for example, if the score set by the user for hardness is relatively low, this indicates that the user feels that the rice is relatively soft in taste and not hard enough, then it is determined that the user is not satisfied with the hardness, and the system will search for the adjustment programs associated with hardness adjustment, such as a heating duration adjustment program, a heating power adjustment program and the like, and increase the heating power and shorten the heating duration so as to reduce the moisture in the rice and improve the hardness of the rice. Of course, the evaluation dimensions of the cooking effect are not limited to the above nine dimensions, and can be specifically set according to actual requirements.

According to the first embodiment of the present disclosure, when the cooking appliance control method is used in a control apparatus, the step of acquiring cooking effect evaluation information of the cooking appliance specifically comprises: displaying a score setting interface comprising the plurality of evaluation dimensions, for the user to set a score for each of the plurality of evaluation dimensions, and generating the cooking effect evaluation information according to the score of each evaluation dimension.

The user can further set a score for each of the plurality of evaluation dimensions on the score setting interface of the control apparatus, which satisfies the use requirements of the user.

According to the first embodiment of the present disclosure, the step of controlling the cooking appliance according to the adjusted control parameters specifically comprises: sending the adjusted control parameters to the cooking appliance, so that the cooking appliance cooks according to the received adjusted control parameters.

By sending the adjusted control parameters to the cooking appliance to make the cooking appliance cook according to the received adjusted control parameters, the user can remotely control the cooking appliance using the control apparatus.

According to the first embodiment of the present disclosure, the method further comprises: sending the cooking effect evaluation information to the cooking appliance.

By sending the cooking effect evaluation information to the cooking appliance, the cooking appliance can adjust the control parameters by itself according to the cooking effect evaluation information, without any need to set the cooking effect evaluation information through the cooking appliance.

Figure 2:
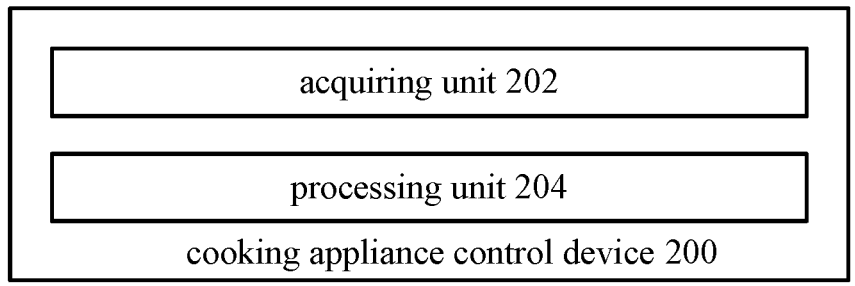
FIG. 2 is a schematic block diagram of a cooking appliance control device according to an embodiment of the present disclosure.

FIG. 2 is a schematic block diagram of a cooking appliance control device according to an embodiment of the present disclosure.

As shown in FIG. 2, the cooking appliance control device 200 according to an embodiment of the present disclosure comprises an acquiring unit 202 and a processing unit 204.

The acquiring unit 202 is used for acquiring cooking effect evaluation information of a cooking appliance, wherein the cooking effect evaluation information comprises a plurality of evaluation dimensions for evaluating cooking effects of the cooking appliance and scores of the plurality of evaluation dimensions; and the processing unit 204 is used for adjusting control parameters of the cooking appliance according to the cooking effect evaluation information, so as to control the cooking of the cooking appliance according to the adjusted control parameters.

By acquiring cooking effect evaluation information of a cooking appliance and adjusting control parameters of the cooking appliance according to the cooking effect evaluation information, the cooking appliance is controlled to cook according to the adjusted control parameters. Since the cooking effect evaluation information directly reflects the cooking effect satisfaction degree of the user, the adjustment of the control parameters according to the cooking effect evaluation information ensures that the final cooking effects fit the actual requirements of the user better, which improves the use experience of the user.

The cooking appliance control device 200 according to the embodiment of the present disclosure can further have the following technical features:

According to one embodiment of the present disclosure, the processing unit 204 is specifically used for: determining a satisfaction degree of the user for each of the plurality of evaluation dimensions according to the scores of the plurality of evaluation dimensions; and adjusting the control parameters of the cooking appliance according to the satisfaction degree of the user for each evaluation dimension.

By determining a satisfaction degree of the user for each of the plurality of evaluation dimensions according to the scores of the plurality of evaluation dimensions, adjusting the control parameters of the cooking appliance according to the satisfaction degree of the user for each evaluation dimension, and determining the satisfaction degree of the user for each evaluation dimension according to the score of each evaluation dimension, it is ensured that the cooking effects required by the user can be accurately achieved, and therefore the control parameters of the cooking appliance can be adjusted more completely and more accurately.

Figure 3:
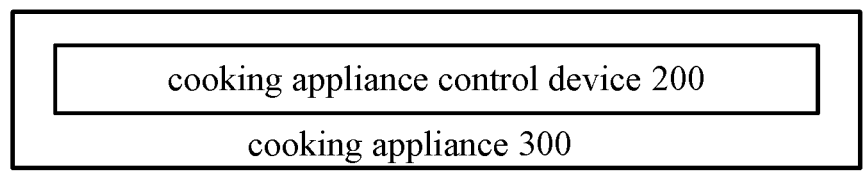
FIG. 3 is a schematic block diagram of a cooking appliance according to an embodiment of the present disclosure.

FIG. 3 is a schematic block diagram of a cooking appliance according to an embodiment of the present disclosure.

As shown in FIG. 3, the cooking appliance 300 according to an embodiment of the present disclosure comprises: the cooking appliance control device 200 as shown in FIG. 2, wherein the acquiring unit 202 is specifically used for: receiving the cooking effect evaluation information input by the user; or receiving the cooking effect evaluation information sent by a control apparatus connected to the cooking appliance.

There are a plurality of methods for acquiring the cooking effect evaluation information of the cooking appliance: one method is that a score setting interface 500 (as shown in FIG. 5) comprising a plurality of evaluation dimensions can be set on the cooking appliance, the user can set a score for each of the plurality of evaluation dimensions via the score setting interface, and the cooking appliance generates cooking effect evaluation information according to the score of each evaluation dimension; and another method is that the user sets the cooking effect evaluation information by means of a control apparatus, and the control apparatus sends the cooking effect evaluation information to the cooking appliance, wherein the control apparatus can be a smartphone, a PC, etc. and can be connected to the cooking appliance in a wired or wireless mode. The cooking appliance 300 includes an electric rice cooker, an electric pressure cooker, etc.

Figure 4:
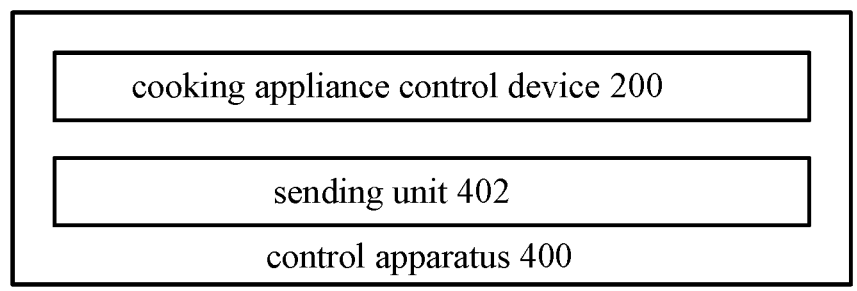
FIG. 4 is a schematic block diagram of a control apparatus according to an embodiment of the present disclosure.

FIG. 4 shows a schematic block diagram of a control apparatus according to an embodiment of the present disclosure.

As shown in FIG. 4, the control apparatus 400 according to an embodiment of the present disclosure comprises: the cooking appliance control device 200 as shown in FIG. 2, wherein the acquiring unit 202 is specifically used for: displaying a score setting interface 500 (as shown in FIG. 5) comprising the plurality of evaluation dimensions, for the user to set a score for each of the plurality of evaluation dimensions, and generating the cooking effect evaluation information according to the score of each evaluation dimension.

The user can further set a score for each of the plurality of evaluation dimensions on the score setting interface of the control apparatus, which satisfies the use requirements of the user.

The control apparatus 400 according to the above embodiment of the present disclosure can further have the following technical features:

According to one embodiment of the present disclosure, the processing unit 204 is further used for sending the adjusted control parameters to the cooking appliance, so that the cooking appliance cooks according to the received adjusted control parameters.

By sending the adjusted control parameters to the cooking appliance to make the cooking appliance cook according to the received adjusted control parameters, the user can remotely control the cooking appliance using the control apparatus.

According to one embodiment of the present disclosure, the control apparatus further comprises: a sending unit 402 for sending the cooking effect evaluation information to the cooking appliance.

By sending the cooking effect evaluation information to the cooking appliance, the cooking appliance can adjust the control parameters by itself according to the cooking effect evaluation information, without any need to set the cooking effect evaluation information through the cooking appliance.

The cooking appliance control method can be implemented based on the cooking appliance itself, or can be implemented jointly by the control apparatus and the cooking appliance.

Embodiment 1: the cooking appliance is provided with a score setting interface including a plurality of evaluation dimensions, the user sets a score for each of the plurality of evaluation dimensions on the score setting interface, the cooking appliance generates cooking effect evaluation information according to the score of each evaluation dimension, and the control parameters of the cooking appliance is adjusted according to the cooking effect evaluation information, so that the cooking appliance is controlled to cook according to the adjusted control parameters.

Embodiment 2: the cooking appliance is provided with a communication module, cooking effect evaluation information sent by a control apparatus is acquired through the communication module (wherein the control apparatus displays a score setting interface including a plurality of evaluation dimensions, the user sets a score for each of the plurality of evaluation dimensions on the score setting interface, and the cooking appliance generates cooking effect evaluation information according to the score of each evaluation dimension), the cooking appliance adjusts the control parameters thereof according to the cooking effect evaluation information, so that the cooking appliance is controlled to cook according to the adjusted control parameters.

Embodiment 3: the control apparatus displays a score setting interface including a plurality of evaluation dimensions, the user sets a score for each of the plurality of evaluation dimensions on the score setting interface, the cooking appliance generates cooking effect evaluation information according to the score of each evaluation dimension, the control apparatus adjusts the control parameters of the cooking appliance according to the cooking effect evaluation information, and sends the adjusted control parameters to the cooking appliance, so as to control the cooking appliance to cook according to the adjusted control parameters.

The technical solutions of the present disclosure are described above in detail with reference to the drawings. The present disclosure provides a novel cooking appliance control solution capable of adjusting the control parameters of the cooking appliance according to the cooking effect evaluation information so as to ensure the final cooking effect, which satisfies the use requirements of the user and improves the use experience of the user.

The descriptions above are only preferable embodiments of the present disclosure, which are not used to limit the present disclosure. For those skilled in the art, the present disclosure may have various changes and variations. Any modifications, equivalent substitutions, improvements etc. within the spirit and principle of the present disclosure shall all be included in the scope of protection of the present disclosure.

What is claimed is:

1. A method for controlling a cooking appliance, comprising:
acquiring cooking effect evaluation information of the cooking appliance provided by a user, wherein the cooking effect evaluation information comprises:
a plurality of evaluation dimensions for evaluating cooking effects on a food caused by the cooking appliance; and
scores of the plurality of evaluation dimensions, wherein the plurality of evaluation dimensions comprises one or more of hardness, water content, gelatinization degree representing a palatability, a flatness, a fluffiness degree, and a puffing rate representing an appearance of the food;
displaying a score setting interface comprising the plurality of evaluation dimensions, in order for the user to set a score for each of the plurality of evaluation dimensions on the score setting interface; the evaluation dimensions comprise a comprehensive score adjusted automatically during use based on a user's selection of a scoring dimension, wherein the evaluation dimensions comprise a comprehensive score adjusted automatically during use based on a user's selection of a scoring dimension;
determining a satisfaction degree of the user for each of the plurality of evaluation dimensions according to the scores of the plurality of evaluation dimensions; and
adjusting control parameters of the cooking appliance according to the cooking effect evaluation information provided by the user, so as to control the cooking appliance according to the adjusted control parameters.

2. The method for controlling the cooking appliance according to claim 1, wherein the step of adjusting control parameters of the cooking appliance according to the cooking effect evaluation information comprises:
adjusting the control parameters of the cooking appliance according to the satisfaction degree of the user for each evaluation dimension.

3. The method for controlling the cooking appliance according to claim 2, wherein the step of acquiring cooking effect evaluation information of the cooking appliance further comprises:

receiving the cooking effect evaluation information sent by the user via a control apparatus connected to the cooking appliance.

4. The method for controlling the cooking appliance according to claim 2, wherein the step of acquiring cooking effect evaluation information of the cooking appliance comprises:

generating the cooking effect evaluation information according to the score of each evaluation dimension.

5. The method for controlling the cooking appliance according to claim 4, wherein the step of controlling the cooking appliance according to the adjusted control parameters further comprises:

sending the adjusted control parameters to the cooking appliance, so that the cooking appliance cooks according to the received adjusted control parameters.

6. The method for controlling the cooking appliance according to claim 4, further comprising:

sending the cooking effect evaluation information to the cooking appliance.

7. The method for controlling the cooking appliance according to claim 1, wherein the step of acquiring cooking effect evaluation information of the cooking appliance further comprises:

receiving the cooking effect evaluation information sent by the user via a control apparatus connected to the cooking appliance.

8. The method for controlling the cooking appliance according to claim 1, wherein the step of acquiring cooking effect evaluation information of the cooking appliance comprises:

generating the cooking effect evaluation information according to the score of each evaluation dimension.

9. The method for controlling the cooking appliance according to claim 8, wherein the step of controlling the cooking appliance according to the adjusted control parameters further comprises:

sending the adjusted control parameters to the cooking appliance, so that the cooking appliance cooks according to the received adjusted control parameters.

10. The method for controlling the cooking appliance according to claim 8, further comprising:

sending the cooking effect evaluation information to the cooking appliance.

11. The method for controlling the cooking appliance according to claim 1, further comprising adjusting a height of columns in a score setting interface to acquire the cooking effect evaluation information; and wherein adjusting control parameters of the cooking appliance according to the cooking effect evaluation information comprises storing a plurality of adjustment programs associated with respective evaluation dimensions, and invoking a corresponding adjustment program according to a score provided by the user for a respective dimension.

* * * * *